A. F. MILLER.
PIPE OR ROD CONNECTOR.
APPLICATION FILED JUNE 24, 1909.

961,981. Patented June 21, 1910.
2 SHEETS—SHEET 1.

WITNESSES:
R. E. Hamilton.
E. B. House.

INVENTOR.
Albert F. Miller
BY Warren D. House
His ATTORNEY.

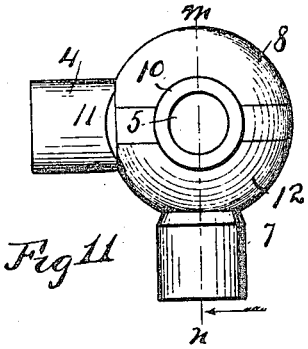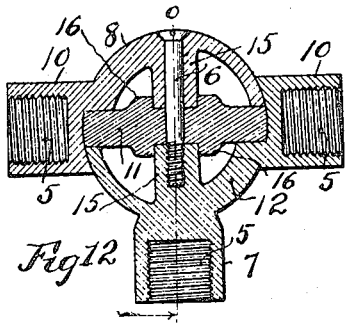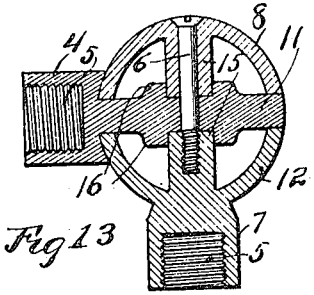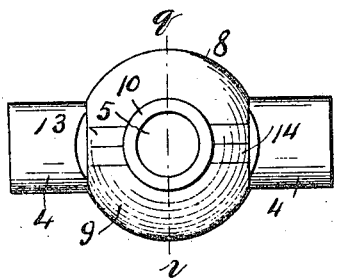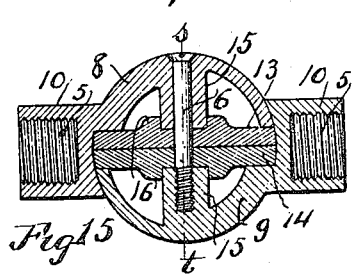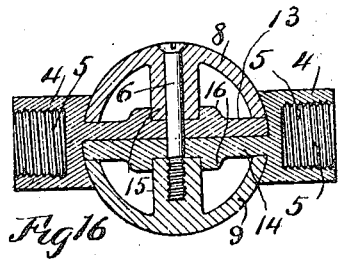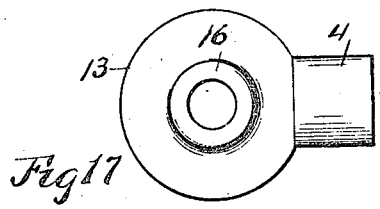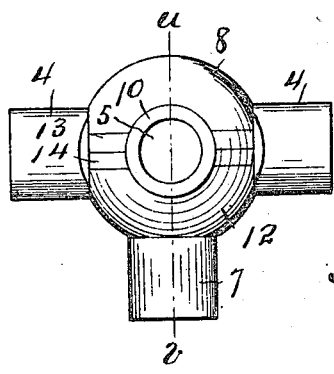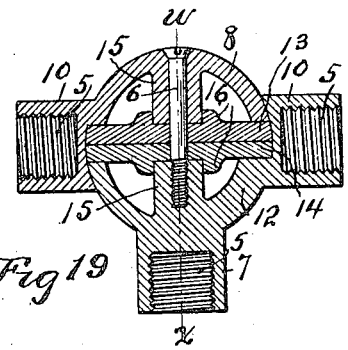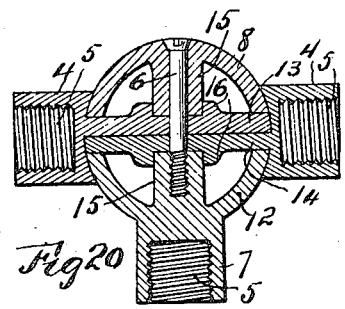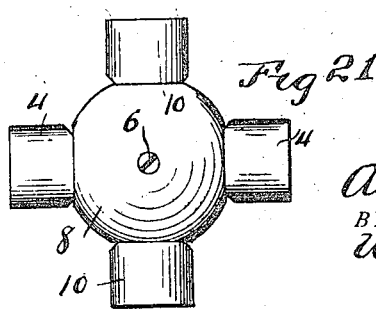

UNITED STATES PATENT OFFICE.

ALBERT F. MILLER, OF KANSAS CITY, KANSAS.

PIPE OR ROD CONNECTOR.

961,981.

Specification of Letters Patent. Patented June 21, 1910.

Application filed June 24, 1909. Serial No. 504,131.

*To all whom it may concern:*

Be it known that I, ALBERT F. MILLER, a citizen of the United States, residing at Kansas City, in the county of Wyandotte and State of Kansas, have invented a certain new and useful Improvement in Pipe or Rod Connectors, of which the following is a specification.

My invention relates to improvements in pipe or rod connectors.

The object of my invention is to provide a pipe or rod connector for firmly connecting two pipes or rods, which will present a smooth and finished appearance and which will permit of the rods or pipes being adjusted to different angles relative to each other.

My invention is particularly adapted for use in constructing pipe or rod frame work, such as is employed in fire-escapes or railings for stairways.

The novel features of my invention are hereinafter fully described and claimed.

Figure 1:
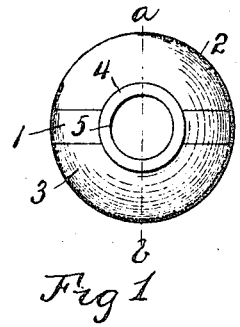
Figure 2:
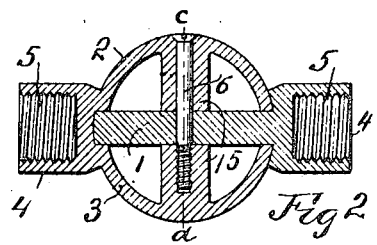
Figure 3:
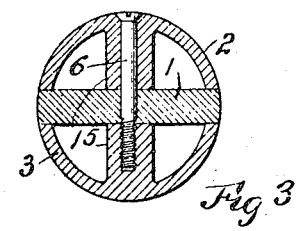
Figure 4:
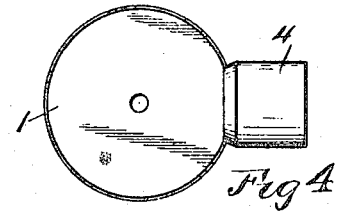
Figure 5:
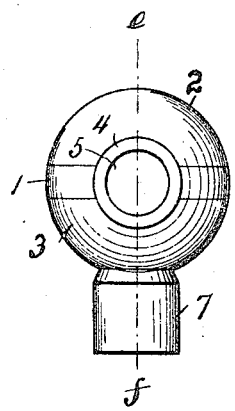
Figure 6:
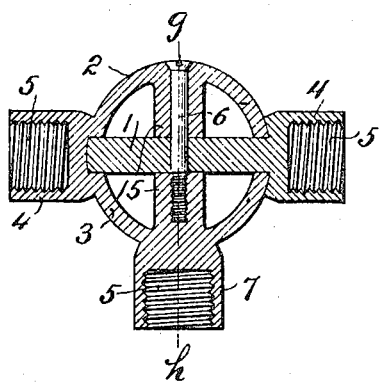
Figure 7:
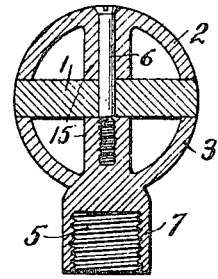
Figure 8:
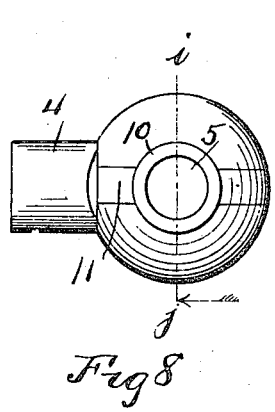
Figure 9:
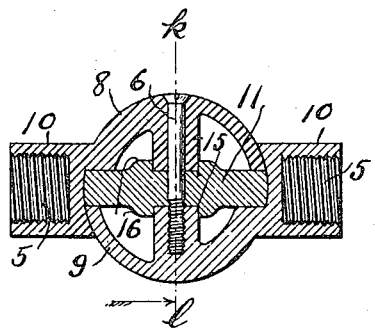
Figure 10:
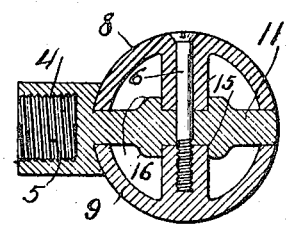

In the accompanying drawings which illustrate my invention—Figure 1 is an elevation of a form of my invention designed to connect two rods or pipes. Fig. 2 is a vertical sectional view, taken on the dotted line $a$—$b$ of Fig. 1. Fig. 3 is a vertical sectional view, taken on the dotted line $c$—$d$ of Fig. 2. Fig. 4 is a plan view of the disk-like connector member, shown in Figs. 1, 2 and 3. Fig. 5 is an elevation of a form of my invention adapted to connect three pipes or tubes, two of which are disposed in a horizontal plane and the other of which is disposed in a vertical plane. Fig. 6 is a vertical sectional view, taken on the dotted line $e$—$f$ of Fig. 5. Fig. 7 is a vertical sectional view, taken on the dotted line $g$—$h$ of Fig. 6. Fig. 8 is an elevation of a form of my invention which is designed to connect three pipes or tubes, all located in the same horizontal plane. Fig. 9 is a vertical sectional view, taken on the dotted line $i$—$j$ of Fig. 8. Fig. 10 is a vertical sectional view taken on the dotted line $k$—$l$ of Fig. 9. Fig. 11 is an elevation of a form of my invention designed to connect four pipes or tubes, three of which are located in a horizontal plane and one of which is located in a vertical plane. Fig. 12 is a vertical section taken on the dotted line $m$—$n$ of Fig. 11. Fig. 13 is a vertical section taken on the dotted line $o$—$p$ of Fig. 12. Fig. 14 is a form of my invention designed to connect four pipes or tubes, of which all are located in a horizontal plane, the connector being shown in elevation. Fig. 15 is a vertical sectional view taken on the dotted line $q$—$r$ of Fig. 14. Fig. 16 is a vertical sectional view, taken on the dotted line $s$—$t$ of Fig. 15. Fig. 17 is a plan view of one of the disk-like members shown in Figs. 14, 15 and 16. Fig. 18 is an elevation of a form of my invention designed to connect five pipes or rods, four of which are located in the same horizontal plane and one of which is located in a vertical plane. Fig. 19 is a vertical sectional view taken on the dotted line $u$—$v$ of Fig. 18. Fig. 20 is a vertical sectional view taken on the dotted line $w$—$x$ of Fig. 19. Fig. 21 is a plan view of the form of my invention shown in Figs. 18, 19 and 20.

Referring to Figs. 1 to 4, 1 denotes the horizontal disk-like portion of one of the connector members, said disk-like portion having its upper and lower flat sides resting against the plane sides respectively of two hemispherical portions of the other connector member, said hemispherical portions being denoted respectively by 2 and 3. Each member is provided with a peripheral boss 4, provided with a radial threaded hole 5, adapted to receive a pipe or rod, not shown. Each boss 4 is fitted to the curved periphery of the opposite member. A vertical bolt 6 extends centrally through the hemispherical portion 2 and the disk-like portion 1 and has its threaded lower end fitted in a vertical, screw-threaded hole, which is provided centrally in the upper side of the hemispherical portion 3. The bolt 6 pivotally connects the two members on a vertical axis.

The form of my invention shown in Figs. 5, 6 and 7 corresponds in construction to the form shown in the first four figures, with the exception that in the form shown in Figs. 5 to 7, the hemispherical portion 3 is provided on its lower side with a vertical boss 7, which is disposed centrally in alinement with the bolt 6, and is provided with a vertical screw threaded hole 5, adapted to receive the upper end of a vertical tube or pipe, not shown.

In the form of my invention shown in Figs. 8, 9 and 10, three members are pivotally connected. Two of the members 8 and 9 are similarly constructed, each having a substantially hemi-spherical portion, similar to the portions 2 and 3 of the form shown in Fig. 2, and each provided with a peripheral boss 10 fitted to the peripheries of the other two members and having a screw threaded hole 5. The other member 11· corresponds in its general form to the disk member 1 of the form shown in Figs. 1 to 4. The disk member 11 is horizontally disposed and has its upper and lower sides resting respectively against the plane sides of the hemispherical portions of the members 8 and 9. A vertical bolt 6 extends centrally through the disk member 11 and the hemi-spherical portion of the member 8, the lower screw threaded end of the bolt 6 being fitted in a screw threaded hole provided in the upper plane side of the member 9. The member 11 is provided with a horizontal peripheral boss 4 fitted to the peripheries of the members 8 and 9 and having a screw threaded hole 5.

In the form of my invention shown in Figs. 11, 12 and 13, two members corresponding to the members 8 and 11, shown in Figs. 8 to 10 are employed and are similarly designated. The third member 12 corresponds to the member 9 with the exception that its curved lower side is provided with a vertical boss 7 having a screw threaded hole 5 and corresponding to the boss 7 shown in Figs. 4, 5 and 6. With the exception of the boss 7, the form shown in Figs. 11 to 13 corresponds in construction to the construction shown in Figs. 8 to 10. The member 11 is provided with a boss 4 disposed horizontally and fitted to the peripheries of the members 8 and 12, and the members 8 and 12 are each provided with a boss 10 disposed horizontally in the same plane as the boss 4 and each fitted to the peripheries of the other two members. A vertical bolt 6 extends centrally through the members 8 and 11 and has its screw threaded lower end fitted in a threaded hole in the upper side and central portion of the member 12.

In the form shown in Figs. 14 to 17 two members 8 and 9 similar in construction to the members similarly designated in Figs. 8 to 10 are similarly related to each other, are similarly provided with horizontal peripheral bosses 10, and are pivotally connected in a similar manner by a vertical bolt 6. Two members 13 and 14 each of disk like form, corresponding in general construction, location and function to the member 11 shown in Figs. 8 to 10 and 11 to 13, are disposed horizontally, one resting flatwise upon the other. The disk like portions of the members 13 and 14 rest respectively against the plane sides of the members 8 and 9, and are provided respectively with the horizontal diametrically opposite bosses 4, each fitted to the peripheries of the other three members. In like manner each of the peripheral bosses 10 of the members 8 and 9 are fitted to the peripheries of the other three members. The vertical bolt 6 extends centrally through holes provided in the members 13 and 14.

In the form of my invention shown in Figs. 18 to 21 the construction corresponds identically with that shown in Figs. 14 to 17, excepting that for the member 9 of the latter figures a member 12 corresponding in form, position and function to the similarly designated member of Figs. 11 to 13, is substituted. The form shown in Figs. 18 to 21 corresponds to the one shown in Figs. 14 to 17 with the exception of the boss 7 which is disposed vertically on the lower side of the member 12, this being the feature which distinguishes member 12 from member 9.

As shown in Figs. 2, 3, 6 and 7 the plane sides of the portions 2 and 3 may be hollow and provided with vertical diametrically opposite central cylindrical studs 15, adjacent ends of which respectively abut against opposite sides of the disk portion 1. By this construction the device may be made light, and material saved in its construction. In like manner the plane sides of the members 8, 9 and 12 may be hollowed, and similarly provided each with a vertical diametrically disposed stud 15 of cylindrical shape. In the forms shown in Figs. 8 to 13 opposite flat sides of the member 11 may be provided with annular central flanges 16 fitted respectively to opposing studs 15 which are concentric with the bolts 6. By this construction much of the strain may be removed from the bolts 6 and the devices thus made stronger. The upper side of each member 13, and the lower side of each member 14, shown in Figs. 15, 16, 19 and 20, may be provided each with an annular central flange 16 fitted to the adjacent stud 15.

From the above description it will be understood that the different pipe connecting members of each of the forms shown may be swung relative to each other in the same plane to different angles to accommodate the devices to different forms of frame work.

The devices of the different forms of my invention are each in the form of a sphere with radial peripheral bosses. By reason of this shape and by reason of some of the bosses of the members being fitted to the peripheries of adjacent members great strength of construction is afforded.

Various modifications of my invention, within the scope of the appended claims, may be made without departing from its spirit.

Having thus described my invention, what I claim and desire to secure by Letters Patent, is:—

1. In a pipe or rod connector, the combination with two members, one having a substantially hemispherical portion, the other having a disk like portion one flat side of which rests against the plane side of the opposite member, each member having a peripheral boss having a radial hole adapted to receive a pipe or rod and fitted to the curved periphery of the opposite member, of means for pivotally connecting the two members on an axis extending centrally through the disk like and hemispherical portions.

2. In a pipe or rod connector, the combination with two members each having a substantially hemispherical portion, of a third member having a disk like portion the flat sides of which respectively rest against the plane sides of the first two members, each member having a peripheral boss having a radial hole adapted to receive a pipe or rod and fitted to the curved peripheries of the other two members, and means for pivotally connecting the three members on an axis which extends centrally through the disk like and hemispherical portions.

3. In a pipe or rod connector, the combination with two members, one having a substantially hemispherical portion, the other having a disk-like portion, one flat side of which rests against the plane side of the opposite member, each member having a peripheral boss adapted to receive a pipe or rod and fitted to the curved periphery of the opposite member, the member having the hemispherical portion being provided also on said hemispherical portion with a peripheral boss similar to the other bosses and disposed at right angles thereto and in the center of said hemispherical portion, of means for pivotally connecting the two members on an axis extending centrally through the disk-like and hemispherical portions.

4. In a pipe or rod connector, the combination with two members each having a substantially hemispherical portion, of a third member having a disk-like portion, the flat sides of which rest respectively against the plane sides of the first two members, each member having a peripheral boss with a radial hole adapted to receive a pipe or rod and fitted to the curved peripheries of the other two members, one of said hemispherical portions having a boss similar to the other bosses and disposed radially and centrally, and means for pivotally connecting the three members on an axis which extends centrally through the disk like and hemispherical portions.

5. In a pipe or rod connector, the combination with two members, one having a substantially hollow hemispherical portion the plane side of which is provided with a central cylindrical diametrical stud, the other member having a disk like portion one flat side of which rests against the plane side of the opposite member, the disk like portion having an annular flange in which said stud is rotatively fitted, each member having a peripheral boss having a radial hole adapted to receive a pipe or rod, of means for pivotally connecting said members concentrically with said stud.

In testimony whereof I have signed my name to this specification in presence of two subscribing witnesses.

ALBERT F. MILLER.

Witnesses:
E. B. House,
L. H. Doering.